(12) United States Patent
Tietze et al.

(10) Patent No.: US 8,975,318 B2
(45) Date of Patent: Mar. 10, 2015

(54) HALOGEN-FREE BENZOXAZINE BASED CURABLE COMPOSITIONS FOR HIGH TG APPLICATIONS

(75) Inventors: Roger Tietze, The Woodlands, TX (US); Yen-Loan Nguyen, Spring, TX (US)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 1071 days.

(21) Appl. No.: 12/918,433

(22) PCT Filed: Feb. 20, 2009

(86) PCT No.: PCT/US2009/034653
§ 371 (c)(1),
(2), (4) Date: Aug. 19, 2010

(87) PCT Pub. No.: WO2009/137144
PCT Pub. Date: Nov. 12, 2009

(65) Prior Publication Data
US 2010/0330287 A1 Dec. 30, 2010

Related U.S. Application Data

(60) Provisional application No. 61/030,366, filed on Feb. 21, 2008.

(51) Int. Cl.
| | |
|---|---|
| C08G 73/02 | (2006.01) |
| C08K 5/357 | (2006.01) |
| C08G 59/24 | (2006.01) |
| C08G 59/40 | (2006.01) |
| C08G 59/50 | (2006.01) |
| C08G 59/62 | (2006.01) |
| C08G 59/68 | (2006.01) |
| C08L 63/00 | (2006.01) |
| C08G 59/06 | (2006.01) |
| C08L 75/08 | (2006.01) |

(52) U.S. Cl.
CPC ............... *C08K 5/357* (2013.01); *C08G 59/06* (2013.01); *C08G 73/0233* (2013.01); *C08G 59/24* (2013.01); *C08G 59/4014* (2013.01); *C08G 59/5046* (2013.01); *C08G 59/621* (2013.01); *C08G 59/683* (2013.01); *C08G 2650/36* (2013.01); *C08L 63/00* (2013.01); *C08L 75/08* (2013.01)
USPC ........................................................... 524/199

(58) Field of Classification Search
USPC .......................................................... 524/199
See application file for complete search history.

(56) References Cited

U.S. PATENT DOCUMENTS

| | | | |
|---|---|---|---|
| 5,021,484 A | 6/1991 | Schreiber et al. | |
| 5,152,939 A | 10/1992 | Ishida | |
| 5,200,452 A | 4/1993 | Schreiber | |
| 5,278,257 A * | 1/1994 | Mulhaupt et al. | 525/454 |
| 5,639,413 A | 6/1997 | Crivello | |
| 6,207,786 B1 * | 3/2001 | Ishida et al. | 528/94 |
| 6,214,904 B1 * | 4/2001 | Tanaka et al. | 523/409 |
| 6,620,905 B1 | 9/2003 | Musa | |
| 7,053,138 B2 | 5/2006 | Magendie et al. | |
| 2004/0054120 A1 * | 3/2004 | Magendie et al. | 528/87 |
| 2004/0123948 A1 | 7/2004 | Dershem et al. | |
| 2006/0173101 A1 | 8/2006 | Takahata et al. | |
| 2006/0287465 A1 * | 12/2006 | Suzuki et al. | 528/98 |
| 2007/0129509 A1 | 6/2007 | Li et al. | |
| 2007/0221890 A1 * | 9/2007 | Gan | 252/601 |

FOREIGN PATENT DOCUMENTS

| | | | | |
|---|---|---|---|---|
| EP | 0356379 | 2/1990 | | |
| EP | 0458739 | 11/1991 | | |
| EP | 1366053 | 12/2003 | | |
| JP | 2001-220955 | 8/2001 | | |
| WO | WO 2006035021 A1 * | 4/2006 | ........... | C07D 413/14 |

\* cited by examiner

*Primary Examiner* — Richard A Huhn

(57) ABSTRACT

The present invention provides a halogen-free curable composition including a benzoxazine monomer, at least one epoxy resin, a catalyst, a toughening agent and a solvent. The halogen-free curable composition is especially suited for use in automobile and aerospace applications since the composition, upon curing, produces a composite having a high glass transition temperature.

6 Claims, No Drawings

HALOGEN-FREE BENZOXAZINE BASED CURABLE COMPOSITIONS FOR HIGH TG APPLICATIONS

CROSS-REFERENCE TO RELATED APPLICATION

This application is the National Phase of international Application PCT/US2009/034653 filed Feb. 20, 2009 which designated the U.S. and which claims priority to U.S. Provisional Application No. 61/030,366 filed Feb. 21, 2008. The noted applications are incorporated herein by reference.

STATEMENT REGARDING FEDERALLY SPONSORED RESEARCH OR DEVELOPMENT

The invention was made with U.S. Government support under Contract No. DE-FG36-07G017012 awarded by the U.S. Department of Energy. Thus, the U.S. Government has certain rights in the invention.

FIELD OF INVENTION

This invention relates to a benzoxazine based halogen-free composition which may be cured to form polymeric networks which are inflammable and exhibit enhanced thermal properties. The benzoxazine based halogen-free curable compositions may be used in a variety of applications including automotive, aerospace, electronic and industrial applications.

BACKGROUND OF THE INVENTION

Benzoxazine compounds have been employed to produce prepregs, laminates, PWB's, moulding compounds, sealants, sinter powders, cast articles, structural composites parts and electrical and electronic components by impregnating operations and infusion processes. To make benzoxazine compound-containing compositions flame retardant bromine, phosphorous, or chlorine containing compounds and/or fillers are added, (for example, EP 0458739, EP 356379, U.S. Pat. No. 5,200,452, U.S. Pat. No. 5,152,939, EP 1366053, or JP2001220455). However, the use of such additives has several drawbacks. For example, they are not soluble in solvents and hence cause problems in terms of processing; they show poor oxidative stabilities at elevated temperatures; they provide a cured resin that often has poor physical properties; and toxic gases of combustion may form in case of fire, especially when halogenated compounds are present. Thus, it's desirable to produce a benzoxazine based composition which does not demonstrate these drawbacks yet can be used in high temperature environments.

SUMMARY OF THE INVENTION

The present invention provides a halogen-free curable composition containing:

(a) a benzoxazine monomer of the formula (I)

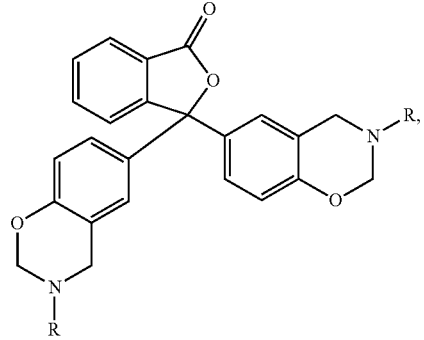

(I)

wherein R is, independently from one another, allyl, unsubstituted or substituted phenyl, unsubstituted or substituted $C_1$-$C_8$ alkyl or unsubstituted or substituted $C_3$-$C_8$ cycloalkyl;

(b) at least one epoxy resin;

(c) a catalyst;

(d) a toughening agent; and (e) a solvent.

The halogen-free curable composition may be used in a variety of applications including those which require the composition, upon curing, exhibit a high glass transition temperature. Thus, the halogen-free curable composition is especially suitable for use as a coating or molding in automobile or aerospace applications where high glass transition temperatures are often needed.

DETAILED DESCRIPTION OF THE INVENTION

In general, the present invention provides a halogen-free curable composition including: (a) a benzoxazine monomer; (b) an epoxy resin; (c) a catalyst; (d) a toughening agent; and (e) a solvent. The curable composition of the present invention, upon curing, provides a cured product having an excellent balance of mechanical and chemical properties including, for example, high glass transition temperature ($T_g$), decomposition temperature ($T_d$), high tensile strength, low coefficient of thermal expansion, good flexibility and flame retardancy.

Benzoxazine Monomer

The halogen-free curable composition of the present invention includes from about 10-90 parts by weight, preferably from about 30-50 parts by weight, and more preferably from about 35-45 parts by weight, per 100 parts by weight of the halogen-free curable composition, of a benzoxazine monomer. As used herein, the term "benzoxazine monomer" refers to a monomer having at least one substituted or unsubstituted benzoxazine group. The benzoxazine monomer may be a mono-functional, di-functional, or tri-functional benzoxazine compound. Moreover, where the term "benzoxazine monomer" is used, it is to be understood that one or more benzoxazine monomers may be used together.

The benzoxazine monomer may be represented by the general formula

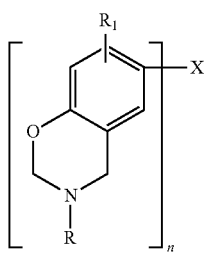

where n=an integer from 0 to 3; R is selected from a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, or a $C_3$-$C_8$ cycloalkyl group; $R_1$ is selected from hydrogen, alkyl or alkenyl; and X is selected from a direct bond (when n=2), a substituted or unsubstituted $C_1$-$C_{20}$ alkylene group, a substituted or unsubstituted $C_6$-$C_{20}$ arylene group, a substituted or unsubstituted $C_2$-$C_{20}$ heteroarylene group or C=O.

In one embodiment, the benzoxazine monomer is a compound of the general formula (I)

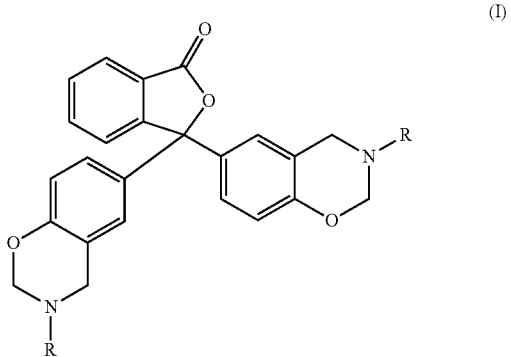

(I)

where R is, independently from one another, allyl, unsubstituted or substituted phenyl, unsubstituted or substituted $C_1$-$C_8$ alkyl or unsubstituted or substituted $C_3$-$C_8$ cycloalkyl. Suitable substituents on the R-groups may include amino, $C_1$-$C_4$ alkyl and allyl. One to four substituents may be present on the R-group. Preferably, the R-groups are the same and more preferably are phenyl.

The benzoxazine monomers are presently available commercially from several sources including Huntsman Advanced Materials Americas Inc., Georgia Pacific Resins Inc. and Shikoku Chemicals Corporation. The benzoxazine monomers may also be obtained by reacting a phenol compound, for example, bisphenol A or phenolphthalein, with an aldehyde, for example, formaldehyde, and a primary amine, under conditions in which water is removed. The molar ratio of phenol compound to aldehyde reactant may be from about 1:3 to 1:10, preferably from about 1:4: to 1:7, and more preferably from about 1:4.5 to 1:5. The molar ratio of phenol compound to primary amine reactant may be from about 1:1 to 1:3, preferably from about 1:1.4 to 1:2.5, and more preferably from about 1:2.1 to 1:2.2. Examples of primary amines include: aromatic mono- or di-amines, aliphatic amines, cycloaliphatic amines and heterocyclic monoamines; for example, aniline, o-, m- and p-phenylene diamine, benzidine, 4,4'-diaminodiphenyl methane, cyclohexylamine, butylamine, methylamine, hexylamine, allylamine, furfurylamine ethylenediamine, and propylenediamine. The amines may, in their respective carbon part, be substituted by $C_1$-$C_8$ alkyl or allyl. Preferred primary amines are according to the general formula $R_a$NH2, wherein $R_a$ is allyl, unsubstituted or substituted phenyl, unsubstituted or substituted $C_1$-$C_8$ alkyl or unsubstituted or substituted $C_3$-$C_8$ cycloalkyl. Suitable substituents on the $R_a$ group include amino, $C_1$-$C_4$ alkyl and allyl. Typically, one to four substituents may be present on the $R_a$ group. Preferably $R_a$ is phenyl.

Epoxy Resin

The halogen-free curable composition of the present invention also includes from about 2-60 parts by weight, preferably from about 20-40 parts by weight, per 100 parts by weight of the halogen-free curable composition, of at least one epoxy resin. Examples of such epoxy resins include polyglycidyl epoxy compounds, non-glycidyl epoxy compounds, epoxy cresol novolac and epoxy phenol novolac compounds.

In one embodiment, the epoxy resin is a non-glycidyl epoxy compound. Non-glycidyl epoxy compounds may be linear, branched, or cyclic in structure. For example, there may be included one or more epoxy resins in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxy resins which contain one or more cyclohexene oxide groups and epoxides which contain one or more cyclopentene oxide groups.

Particularly suitable non-glycidyl epoxy compound's include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methyl-cyclohexanecarboxylate, di(3,4-epoxycyclohexylmethyl) hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy)cyclohexane-1,3-dioxane, and 2,2'-bis-(3,4-epoxy-cyclohexyl)-propane.

Catalyst

The halogen-free curable composition also contains from about 0.1-20 parts by weight, preferably from about 0.5-15 parts by weight, per 100 parts by weight of the halogen-free curable composition, of a catalyst to accelerate the curing of the halogen-free curable composition.

In one embodiment, the catalyst is a phenolic compound, preferably having a functionality of two or more. Examples of such phenolic compounds include: a) resins obtained from the reaction of phenols or alkylated phenols with formaldehyde, such as novolac resins or resole resins; and b) polyhydroxy aromatic materials such as: tris(hydroxyphenyl)methane; tris(hydroxyphenyl)ethane; 1,3,5-trihydroxybenzene; and tetraphenolethane.

Toughening Agent

The halogen-free curable composition of the present invention further includes from about 0.1-40 parts by weight, preferably from about 0.5-20 parts by weight, per 100 parts by weight of the halogen-free curable composition, of a toughening agent.

In one embodiment, the toughening agent is a compound of the general formula

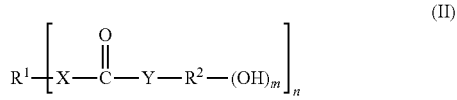

where m is 1 or 2, n is 2 to 6, $R^1$ is an n-valent radical of an elastomeric prepolymer after the removal of the terminal isocyanate, amino or hydroxyl groups, the elastomeric prepolymer being soluble or dispersible in epoxy resin, X and Y independently of one another are —O— or —$NR^3$—, at least one X or Y being —$NR^3$—, $R^2$ is an m+1-valent radical of polyphenol or aminophenol after the removal of the phenolic hydroxyl group(s) and optionally of the amino group, and $R^3$ is hydrogen, $C_1$-$C_6$ alkyl or phenol.

A detailed description of the toughening agent of formula (II) is given in U.S. Pat. No. 5,278,257, column 4, line 20 to column 16, line 20, the disclosure of which is incorporated herein by reference. An example of the toughening agent is Flexibilizer DY 965 (available from Huntsman Advanced Materials Americas Inc., prepared according to Example 16 of U.S. Pat. No. 5,278,257).

Solvent

In addition to components (a)-(d), the halogen-free curable composition of the present invention also contains from about 1-50 parts by weight, preferably from about 5-40 parts by weight, and more preferably from about 20-30 parts by weight, per 100 parts by weight of the halogen-free curable composition, of a solvent.

In one embodiment, the solvent is selected from the group consisting of methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycol, glycol acetate, toluene, xylene and mixtures thereof.

Optional Additives

In addition to the components (a)-(e) identified above, the halogen-free curable composition may also include, if necessary, additives for enhancing strength, release properties, hydrolysis resistance, electrical conductivity and other characteristics. The additives may be added to the halogen-free curable composition in an amount of less than about 50 parts by weight, preferably less than about 30 parts by weight and most preferably less than about 20 parts by weight, per 100 parts by weight of the halogen-free curable composition.

Such optional additives may include reinforcement fibers, such as: metal fibers (e.g. iron, copper, brass, bronze, aluminum) ceramic fibers, glass fibers, carbon fibers, gypsum fibers, rock wool, wollastonite, sepiolite, attapulgites, synthetic mineral fibers, aramid fibers, polyimide fibers, polyamide fibers, phenolic fibers, cellulose fibers and acrylic fibers; fillers; micro or hollow spheres; plasticizers; carbon black or graphite; dyestuffs; and metal powders.

The halogen-free curable compositions of the present invention can be prepared in known manner, for example, by premixing individual components and then mixing these premixes, or by mixing all of the components together using customary devices, such as a stirred vessel, stirring rod, ball mill, sample mixer, static mixer or ribbon blender. Once formulated, the halogen-free curable composition of the present invention can be packaged in a variety of containers such as steel, tin, aluminium, plastic, glass or cardboard containers.

Thus, in one embodiment, the halogen-free curable composition of the present invention is prepared by mixing together from about 10-90 parts by weight of the benzoxazine monomer, from about 2-60 parts by weight of the epoxy resin, from about 0.1-20 parts by weight of the catalyst, from about 0.1-40 parts by weight of the toughening agent, and from about 1-50 parts by weight of the solvent, per 100 parts by weight of the halogen-free curable composition. In another embodiment, the halogen-free curable composition of the present invention is prepared by mixing together from about 30-50 parts by weight of the benzoxazine monomer, from about 20-40 parts by weight of the epoxy resin, from about 0.5-15 parts by weight of the catalyst, from about 0.5-20 parts by weight of the toughening agent, and from about 5-40 parts by weight of the solvent, per 100 parts by weight of the halogen-free curable composition. The halogen-free curable composition, once mixed, may then be applied to a substrate and cured at a temperature greater than 150° C. to form a composite article.

In another embodiment, the halogen-free curable composition, upon mixing and curing, provides a cured composite article having a glass transition temperature greater than 120° C., preferably greater than 160° C., most preferably greater than 200° C., and especially preferably greater than 230° C. Thus, in another embodiment, the present invention provides a halogen-free curable composition comprising:
(a) 10-90 parts by weight of a benzoxazine monomer of the formula (I)

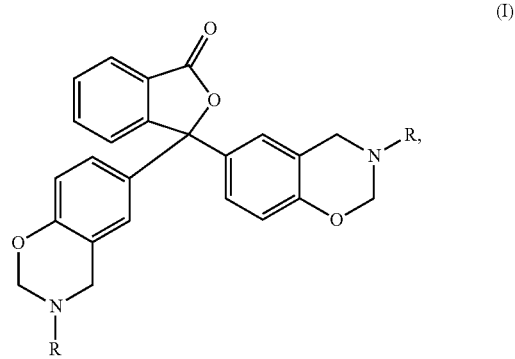

wherein R is, independently from one another, allyl, unsubstituted or substituted phenyl, unsubstituted or substituted $C_1$-$C_8$ alkyl or unsubstituted or substituted $C_3$-$C_8$ cycloalkyl;
(b) 2-60 parts by weight of at least one epoxy resin;
(c) 0.1-20 parts by a catalyst;
(d) 0.1-40 parts by weight of a toughening agent; and
(e) 1-50 parts by weight of a solvent,
per 100 parts by weight of the halogen-free curable composition wherein the halogen-free curable composition, upon curing, has a glass transition temperature greater than 160° C., preferably greater than 200° C., and more preferably greater than 230° C.

The halogen-free curable composition of the present invention may be used in many applications, such as, for example, casting, laminating, impregnating, coating, adhering or gluing, painting, binding, insulating, or in embedding, pressing, injection molding, extruding, sand mold binding, foam and ablative materials.

Thus, in another embodiment of the invention, the halogen-free curable composition may be used as an adhesive for gluing or adhering parts made of the same or different substrates to form an article. The halogen-free curable composition is first placed in contact with at least one of two or more of the same or different substrates to be bonded. The halogen-free curable composition may be applied to the substrate(s) in a variety of ways, such as by extruding, spraying, gravure printing, or coating. In one embodiment, the halogen-free curable composition is sandwiched between a first and second substrate. The halogen-free curable composition and substrates are then heated at a temperature greater than 150° C. By applying heat, an adhesive bond is formed so as to adhere the substrates together and form the article. Substrates in which the halogen-free curable composition may be applied include plastics, metals, ceramics, glass, graphite and cellulosic materials.

The halogen-free curable composition of the present invention is especially suitable for use in applications where high heat stabilities are required, for example, in forming a composite article for use as a fuel cell for: supplying power in conventional automobiles, hybrid cars, small boats; small-scale local power generation; household power generation; simple power supplies for isolated facilities such as camp sites; and as power supplies for satellites, space development and computers.

Thus, in another embodiment, the halogen-free curable composition may be applied to graphite and molded to produce a fuel cell. The graphite, halogen-free curable composition and an optional release agent, for example, carnauba wax, fatty acid ester, metal salts of stearic acid or montanic acid, are blended in a mixer, kneaded, and either injection molded, transfer molded or compression molded to produce the fuel cell.

EXAMPLES

Preparation of Benzoxazine Based Halogen Free Curable Compositions

The following components in Table 1 were added to a glass container and sufficiently mixed to homogeneity:

TABLE 1

| Component | Example 1 Grams | Example 2 grams | Example 3 (Comparative) grams | Example 4 (Comparative) grams | Example 5 (Comparative) grams | Example 6 (Comparative) grams |
|---|---|---|---|---|---|---|
| Phenolphthalein-based benzoxazine | 35 | 40 | | | | |
| Bisphenol A benzoxazine | | | 40 | 50 | 40 | |
| 3,4-epoxy cyclohexane carboxylate | 25 | 28.6 | | 20 | | |
| Epoxy cresol novolak | | | 50 | | | 20 |
| Phenol novolak | | | | | | 50 |
| Bisphenol A adduct | | | | 30 | | 30 |
| Dicyclopentadiene Epoxy | | | | | 50 | |
| Tetraphenolethane | 10 | 5.7 | | | | |
| Flexibilizer DY 965 | 10 | 5.7 | 10 | | 10 | |
| Acetone | 20 | 20 | | | | |

Examples 1-6 were then cast and cured from 200° C. to 255° C. for 1-5 hours then post-cured from 200° C. to 240° C. for 1-4 hours. The cured products were analytically tested according to ASTM E1545-05, ASTME1641-07, ASTM E831-05 and AMTM-0046 and provided the following properties:

TABLE 2

| System | Gel Time at 200° C. (sec) | Glass Transition Temp. $T_g$ by TMA (° C.) | CTE by TMA prior to $T_g$ (um/m °C.) | Decomposition Temp. by TGA (° C.) | Weight Loss (%) | Softening Point (° C.) |
|---|---|---|---|---|---|---|
| Example 1 | 365 | 247 | 61 | 343 | 3.8 | 88.1 |
| Example 2 | 441 | 261 | 52 | 347 | 3.8 | 74.6 |
| Example 3 | >600 | 183 | 64 | 262 | 8.4 | 70.5 |

TABLE 2-continued

| System | Gel Time at 200° C. (sec) | Glass Transition Temp. $T_g$ by TMA (° C.) | CTE by TMA prior to $T_g$ (um/m ° C.) | Decomposition Temp. by TGA (° C.) | Weight Loss (%) | Softening Point (° C.) |
|---|---|---|---|---|---|---|
| Example 4 | >600 | 104 | 65 | 334 | 5.2 | 87 |
| Example 5 | >600 | 175 | 67 | 317 | 2.5 | 81 |
| Example 6 | >600 | 104 | 65 | 334 | 5.2 | 87 |

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A halogen-free curable composition comprising:
   (a) a benzoxazine monomer of the formula (I)

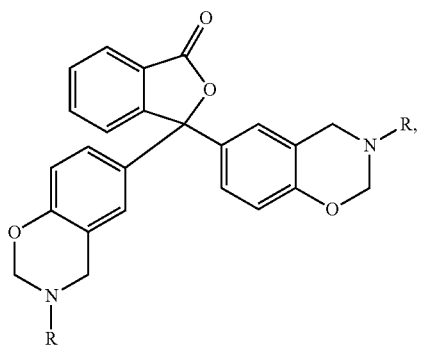

(I)

wherein each R is, independently from one another, allyl, unsubstituted or substituted phenyl, unsubstituted or substituted $C_1$-$C_8$ alkyl or unsubstituted or substituted $C_3$-$C_8$ cycloalkyl;
   (b) at least one epoxy resin;
   (c) 5.7-10 parts by weight of a catalyst selected from tetraphenolethane;
   (d) 5.7-10 parts by weigh of a toughening agent of the formula (II)

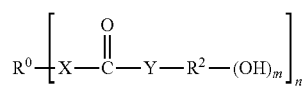

(II)

wherein m is 1 or 2, n is 2 to 6, $R^0$ is an n-valent radical of an elastomeric prepolymer after the removal of the terminal isocyanate, amino or hydroxyl groups, the elastomeric prepolymer being soluble or dispersible in epoxy resin, X and Y independently of one another are —O— or —NR$^3$—, at least one X or Y being —NR$^3$—, $R^2$ is an m+1-valent radical of polyphenol or aminophenol after the removal of the phenolic hydroxyl group(s) and optionally of the amino group, and $R^3$ is hydrogen, $C_1$-$C_6$ alkyl or phenol; and
   (e) a solvent
where the parts by weight are per 100 parts by weight of the composition.

2. The halogen-free curable composition according to claim 1 wherein R is phenyl.

3. The halogen-free curable composition according to claim 1 wherein the solvent is selected from the group consisting of methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycol, glycol acetate, toluene, xylene and mixtures thereof.

4. A halogen-free curable composition comprising:
   (a) 10-90 parts by weight of a benzoxazine monomer of the formula (I)

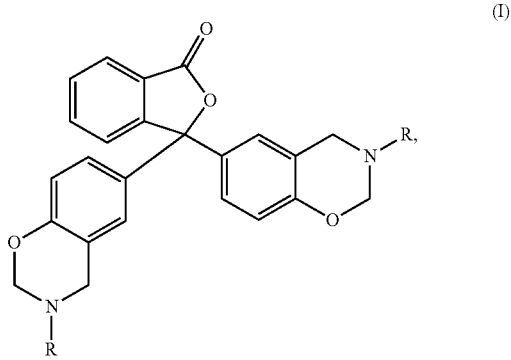

(I)

wherein each R is, independently from one another, allyl, unsubstituted or substituted phenyl, unsubstituted or substituted $C_1$-$C_8$-alkyl or unsubstituted or substituted $C_3$-$C_8$ cycloalkyl;
   (b) 2-60 parts by weight of at least one epoxy resin;
   (c) 5.7-10 parts by weight of a catalyst selected from tetraphenolethane;
   (d) 5.7-10 parts by weight of a toughening agent of the formula (II)

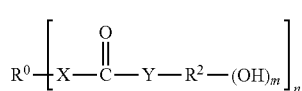

(II)

wherein m is 1 or 2, n is 2 to 6, $R^0$ is an n-valent radical of an elastomeric prepolymer after the removal of the terminal isocyanate, amino or hydroxyl groups, the elastomeric prepolymer being soluble or dispersible in epoxy resin, X and Y independently of one another are —O— or —NR$^3$—, at least one X or Y being —NR$^3$—, $R^2$ is an m+1-valent radical of polyphenol or aminophenol after the removal of the phenolic hydroxyl group(s) and optionally of the amino group, and $R^3$ is hydrogen, $C_1$-$C_6$ alkyl or phenol; and (e) 1-50 parts by weight of a solvent, per 100 parts by weight of the halogen-free curable composition wherein the halogen-free curable composition, upon curing, has a glass transition temperature greater than 160° C.

5. The halogen-free curable composition according to claim 4, wherein the glass transition temperature is greater than 200° C.

6. The halogen-free curable composition according to claim 4, wherein the glass transition temperature is greater than 230° C.

* * * * *